(12) United States Patent
Lange et al.

(10) Patent No.: US 11,814,800 B2
(45) Date of Patent: Nov. 14, 2023

(54) STREET SWEEPER

(71) Applicant: Glutton Cleaning Machines SA, Andenne (BE)

(72) Inventors: Christian Lange, Ohey (BE); Jean-Benoît Langouche, Comblain-au-Pont (BE); Franck Buddeker, Remicourt (BE); Adrien Maréchal, Visé (BE); Tom Bruggeman, Haasdonk (BE)

(73) Assignee: GLUTTON CLEANING MACHINES SA, Andenne (BE)

( * ) Notice: Subject to any disclaimer, the term of this patent is extended or adjusted under 35 U.S.C. 154(b) by 1031 days.

(21) Appl. No.: 16/463,668

(22) PCT Filed: Nov. 23, 2017

(86) PCT No.: PCT/EP2017/080184
§ 371 (c)(1),
(2) Date: May 23, 2019

(87) PCT Pub. No.: WO2018/096029
PCT Pub. Date: May 31, 2018

(65) Prior Publication Data
US 2020/0149237 A1 May 14, 2020

(30) Foreign Application Priority Data

Nov. 24, 2016 (BE) .................................... 2016/5878
Nov. 22, 2017 (BE) .................................... 2017/5853
Nov. 22, 2017 (BE) .................................... 2017/5854

(51) Int. Cl.
*E01H 1/08* (2006.01)
*F16H 21/16* (2006.01)

(52) U.S. Cl.
CPC ........... *E01H 1/0845* (2013.01); *F16H 21/16* (2013.01)

(58) Field of Classification Search
CPC ......... E01H 1/0845; E01H 1/053; E01H 1/05; E01H 1/04; E01H 3/02; E01H 11/00; E01H 1/08; F16H 21/16; A47L 11/4052
(Continued)

(56) References Cited

U.S. PATENT DOCUMENTS 2,960,708 A    11/1960   Dear et al.
4,831,684 A *   5/1989   Duncan ................... E01H 1/053
                                                              15/340.1
(Continued)

FOREIGN PATENT DOCUMENTS

DE       2924502 A1    1/1981
DE       4128988 A1    3/1993
(Continued)

*Primary Examiner* — Katina N. Henson
(74) *Attorney, Agent, or Firm* — Reinhart Boerner Van Deuren P.C.

(57) ABSTRACT

The present invention relates to street sweeper. According to a first aspect of the invention, different mechanisms are disclosed for controlling the movement of the brush-holder arms in a horizontal plane, while also damping side and front impacts. According to a second aspect, a sweeper is disclosed, in which the movement of the brush-holder arms (3) in a vertical plane is imparted by a set of four profile members, arranged in two pairs which each forms a deformable parallelogram, wherein the deformation of the parallelogram is actuated by a jack (25) and the own weight of the sweeping arm. The jack is configured to remain below the upper profile members (11) of the two pairs when the brush-holder arm is raised to its maximum height. Accord-
(Continued)

ing to a third aspect, the suction turbine (103) is arranged in such a way that load losses are reduced during the operation of the sweeper.

22 Claims, 12 Drawing Sheets

(58) Field of Classification Search
USPC .................................... 15/340.1, 87, 340.4
See application file for complete search history.

(56) References Cited

U.S. PATENT DOCUMENTS

| | | | |
|---|---|---|---|
| 9,010,467 B2* | 4/2015 | Burnier .................. | B60K 25/06 |
| | | | 180/53.4 |
| 2014/0101874 A1* | 4/2014 | Du Maire ............... | E01H 1/053 |
| | | | 15/87 |

FOREIGN PATENT DOCUMENTS

| | | | |
|---|---|---|---|
| EP | 1715103 | A2 | 10/2006 |
| FR | 2297286 | A1 | 8/1976 |
| FR | 2912349 | A1 | 8/2008 |
| GB | 2244741 | A | 12/1991 |
| WO | WO 2014/012158 | A1 | 1/2014 |

* cited by examiner

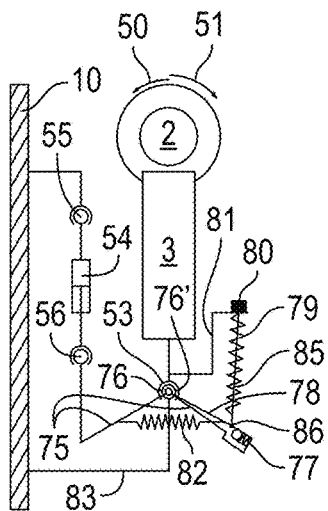 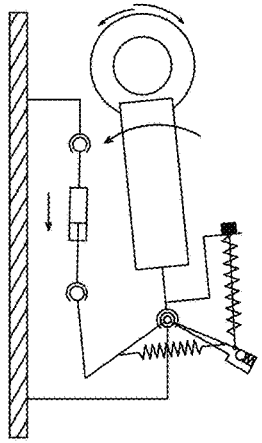 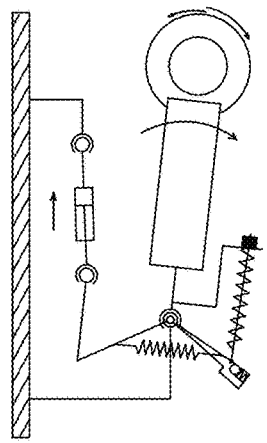
FIG. 6a  FIG. 6b  FIG. 6c
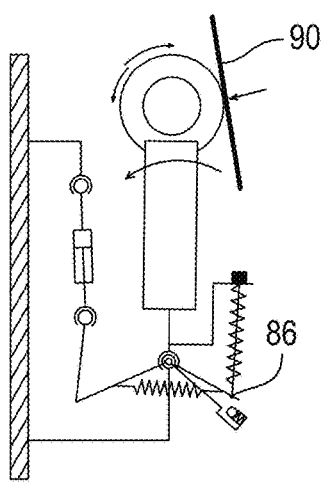 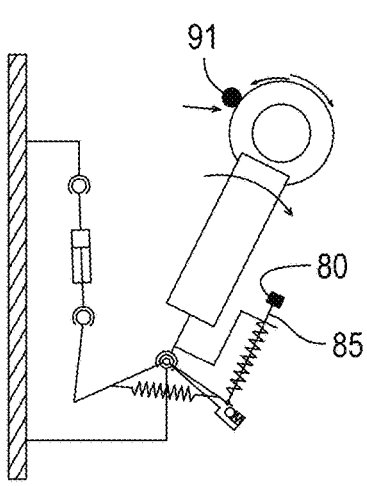 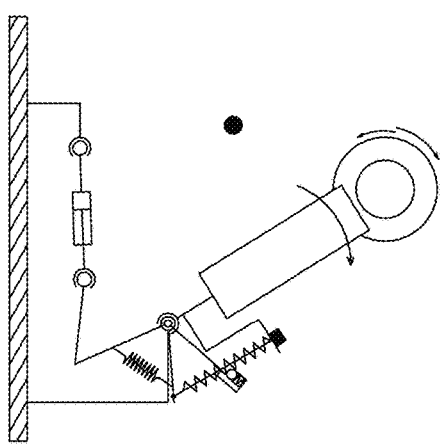
FIG. 7a  FIG. 7b  FIG. 7c

STREET SWEEPER

OBJECT OF THE INVENTION

The present invention relates to a street sweeper with an on-board driver. It relates to a cleaning vehicle provided with a heat engine or electric motor and one or more rotating brushes in contact with the ground, as well as waste suction and collection systems, and which comprises a cabin for the driver.

TECHNOLOGICAL BACKGROUND

The sweepers of the type as described in the present invention are used in urban or industrial environments, for cleaning large surface areas. The driver is seated in the cabin, where he has access to the steering control elements of the vehicle and the control elements of the cleaning means. For most of the machines that are currently known these means comprise a pair of arms placed under the cabin and which extend in front of and/or at the periphery of the vehicle and which bear, at their end, a rotating brush for clearing the waste from the ground. The waste is brought by the brushes to a central suction mouth, whence they are sucked by the action of a turbine to a container incorporated in the sweeper.

One problem of this type of machine is related to the appropriate control of the brush-holder arms. It is advantageous to keep the brushes on the ground with a constant pressure, but this is often impossible to perform by the current systems. Furthermore, the brush-holder arms have often limited capability of absorbing the shocks caused by obstacles met in the field, which leads to frequent blockages.

Another major problem for this type of machines is that the cabin offers a space that is too small for tall people.

A final problem is related to the suction system which is often inefficient because of significant pressure losses in the passage of the waste through the system.

SUMMARY OF THE INVENTION

The present invention relates to a sweeper as described in the attached claims.

According to a first aspect, the sweeper is provided with different mechanisms for allowing the control of the movement of the brush-holder arms in a horizontal plane, also allowing the absorption of lateral and/or frontal shocks.

A second aspect relates to a sweeper wherein the movement of the brush-holder arms in a vertical plane is actuated by a set of four profile members, arranged in two pairs, which each form a deformable parallelogram, and for which the deformation of the parallelogram is actuated by an actuator and by the weight of the brush-holder arm. The actuator is configured so as to remain below the top profile members of the two pairs, when the brush-holder arm is raised to the maximum.

A third aspect is related to an arrangement of the suction turbine which allows for a reduction of the pressure losses during the operation of the sweeper.

The terms "vertical" and "horizontal" used in the present description and in the claims are applicable to a sweeper when it is located on an essentially horizontal terrain.

The invention according to the first aspect is more particularly related to a sweeper comprising a frame, at least three wheels, a propulsion motor, a cabin for the driver, one or more brushes, each brush being able to perform a rotation relative to an armature mounted at the end of a brush-holder arm which extends in front of and/or at the periphery of the cabin, and waste suction and collection means, characterized in that:

each of the brush-holder arms is provided with a mechanism configured to pivot the brush-holder arm about an essentially vertical axis, said mechanism comprising a linear actuator and a first auxiliary arm, the actuator being mounted between two pivots, one of the two pivots being connected to the frame and the other pivot being connected to the first auxiliary arm, the latter being able to pivot about the same essentially vertical axis as the brush-holder arm, but independently thereof, the first auxiliary arm and the brush-holder arm are connected to one another at least by a first spring and by an abutment, configured to maintain a constant position of the brush-holder arm relative to the first auxiliary arm upon the actuation of the actuator in either one of the two linear directions, said actuation generating a rotation of the assembly of the first auxiliary arm and of the brush-holder arm in one of the two rotational directions, in case of the presence of an external lateral force acting on the brush and pushing it towards the interior of the sweeper, the first spring allows a pivoting of the brush-holder arm towards the frame, without pivoting of the first auxiliary arm.

According to an embodiment of the first aspect of the invention, the sweeper comprises a support which is fixed to the brush-holder arm, and wherein a point of the first auxiliary arm, said point being located at the other side of said essentially vertical axis than the side at which the actuator is located, is connected to one of the ends of the first spring, the other end of said first spring being connected to the support which is fixed to the brush-holder arm, and wherein the displacement of the first auxiliary arm towards the support is limited by the abutment which is a push abutment, such that the actuation of the actuator in either one of the two linear directions generates a rotation of the first auxiliary arm in one of the two rotational directions, the first auxiliary arm driving the brush-holder arm by means of the abutment or by means of the first spring.

According to a further embodiment of the first aspect of the invention, the sweeper further comprises a second spring, a support which is fixed to the brush-holder arm, a second auxiliary arm, and wherein the abutment is a spring abutment, the second auxiliary arm being able to pivot about the same essentially vertical axis as the brush-holder arm and the first auxiliary arm but independently thereof, the first spring being mounted between the first and the second auxiliary arms, the spring abutment and the first spring being configured to be able to keep the two auxiliary arms fixed to one another as long as the spring abutment is not broken, the second spring being connected at one of its ends to a rod which is connected to the second auxiliary arm by a pivot, the second spring abutting at its second end on the support, the second spring surrounding said rod, said rod passing through the support and being provided with a retaining block which prevents the separation of said rod from the support, such that:

the actuation of the actuator in either one of the two linear directions generates a rotation of the first auxiliary arm in one of the two rotational directions, the first auxiliary arm driving the brush-holder arm by means of the retaining block or by means of the second spring, the spring abutment and the first spring are configured to maintain the connection between the auxiliary arms upon the actuation of the brush-holder arm by the actuator, the spring abutment is configured to be broken by lateral or frontal forces of a predefined level, exerted on the brush-holder arm, such that the brush-holder arm can temporarily pivot relative to the first auxiliary arm, without forcing the actuator.

The sweeper according to the latter embodiment is advantageously configured in a way that, in the case of the presence of a lateral force which tends to move the brush-holder arm away from the frame, the second spring is compressed allowing a rotation of the brush-holder arm relative to the first auxiliary arm, the latter remaining immobile, and wherein said compression of the second spring is configured to continue until it breaks the spring abutment, thus allowing the first spring to pull the brush-holder arm backwards.

According to a further embodiment of the first aspect of the invention, the first auxiliary arm comprises a first part on one side of the essentially vertical axis and a second part on the other side of said essentially vertical axis, the first part being connected to the second pivot, the sweeper further comprising a second auxiliary arm which can be pivoted about the same essentially vertical axis as the brush-holder arm and the first auxiliary arm but independently thereof, the first spring and the abutment, which is a push abutment, being mounted between the second auxiliary arm and the brush-holder arm, a second spring being mounted between the second part of the first auxiliary arm and the second auxiliary arm, the second spring being connected at the first of its two ends to a rod which extends inside the second spring, said rod being connected to the second auxiliary arm by a pivot, the second spring abutting at its second on the second part of the first auxiliary arm, the rod being able to slide relative to the first auxiliary arm and the rod comprising a retaining block which prevents the separation of the rod from the first auxiliary arm, such that:

the actuation of the actuator in either one of the two linear directions generates a rotation of the first auxiliary arm in one of the two rotational directions, the first auxiliary arm driving the brush-holder arm by means of the abutment or by means of the first spring, in case of presence of a lateral force which tends to move the brush-holder arm away from the frame:
first, the second spring is compressed, allowing the second auxiliary arm to pivot relative to the first arm, without forcing the actuator,
when the second spring reaches a predefined level of compression, this spring extends itself, pulling the brush-holder arm backwards.

The sweeper according to any one of the preceding embodiments may further comprise an additional spring mounted between the frame and a structure that can be displaced in the horizontal direction, said displaceable structure being connected to a support arm, the brush-holder arm and the first auxiliary arm being connected to the support arm such that:

the brush-holder arm and the first auxiliary arm can be pivoted relative to the support arm, about said essentially vertical axis, the additional spring is configured to absorb the frontal shocks exerted on the brush-holder arm.

According to a further embodiment of the first aspect of the invention, the sweeper comprises a frame, at least three wheels, a propulsion motor, a cabin for the driver, one or more brushes, each brush being able to perform a rotation relative to an armature mounted at the end of a brush-holder arm which extends in front of and/or at the periphery of the cabin, and waste suction and collection means, characterized in that each of the brush-holder arms is provided with a mechanism configured to pivot the brush-holder arm around an essentially vertical axis, said mechanism comprising a linear actuator and a first auxiliary arm, the actuator being mounted between two pivots, one of the two pivots being connected to the frame and the other pivot being connected to the first auxiliary arm, the latter being able to pivot about the same essentially vertical axis as the brush-holder arm but independently thereof, the sweeper further comprising a spring mounted between the frame and a structure that can be displaced in a horizontal direction, said displaceable structure being connected to a support arm, the brush-holder arm and the first auxiliary arm being connected to the support arm such that:

the brush-holder arm and the first auxiliary arm can pivot relative to the support arm about said essentially vertical axis, the spring is configured to absorb the frontal shocks exerted on the brush-holder arm.

An alternative way of describing a number of embodiments of the first aspect of the invention is as follows. The inclusion of the numeric references does not limit the interpretation of the terms used. A first embodiment concerns a sweeper comprising a frame (10), at least three wheels (5), a propulsion motor, a cabin (1) for the driver, one or more brushes (2), each brush being able to perform a rotation relative to an armature (19) mounted at the end of the brush-holder arm (3) which extends in front of and/or at the periphery of the cabin, and waste suction and collection means, characterized in that each of the brush-holder arms (3) is provided with a mechanism configured to pivot the brush-holder arm about a vertical axis, said mechanism comprising a linear actuator (54), a first auxiliary arm (57), a first linear spring (59) and a support (60) which is fixed to the brush-holder arm (3), the actuator (54) being mounted between two pivots (55,56), one of the two pivots (55) being connected to the frame (10) and the other pivot (56) being connected to the first auxiliary arm (57), the latter being able to pivot about the same vertical axis as the brush-holder arm (3) but independently thereof, and wherein a point of the first auxiliary arm (57) which is located at the other side of said essentially vertical axis than the side at which the actuator (54) is located, is connected to one of the ends of the first spring (59), the other end of said first spring (59) being connected to the support (60) which is fixed to the brush-holder arm (3), and wherein the displacement of the first auxiliary arm (57) toward the support (60) is limited by an abutment (61), such that:

the actuation of the actuator (54) in either of the two linear directions generates a rotation of the first auxiliary arm (57) in one of the two rotational directions, the first auxiliary arm (57) driving the brush-holder arm (3) by means of the abutment (61) or by means of the first spring (59), in case of a lateral external force acting on the brush (2), the first spring (59) allows a pivoting of the brush towards the frame (10), without pivoting of the first auxiliary arm (57).

The sweeper according to the preceding paragraph may further comprise a second spring (65) mounted between the frame (10) and a structure (66) that can be displaced in a horizontal direction, said displaceable structure being connected to a second auxiliary arm (67), the brush-holder arm (3) and the first auxiliary arm (57) being connected to the second arm such that the brush-holder arm (3) and the first auxiliary arm (57) can pivot relative to the second auxiliary arm (67).

According to another embodiment, the sweeper of the invention comprises a frame (10), at least three wheels (5), a propulsion motor, a cabin (1) for the driver, one or more brushes (2), each brush being able to perform a rotation relative to an armature (19) mounted at the end of a brush-holder arm (3) which extends in front of and/or at the periphery of the cabin, and waste suction and collection means, characterized in that each of the brush-holder arms (3) is provided with a mechanism configured to pivot the brush-holder arm about a vertical axis, said mechanism comprising a linear actuator (54), a first auxiliary arm (75), a first spring (79), a support (81) which is fixed to the brush-holder arm, a second auxiliary arm (78), a spring plunger (77), a second spring (82), the actuator being mounted between two pivots (55,56), one pivot being connected to the frame (10) and the other being connected to the first auxiliary arm (75), the latter being able to pivot about the same vertical axis as the brush-holder arm but independently thereof, the second auxiliary arm (78) being able to pivot about the same vertical axis as the brush-holder arm and the first auxiliary arm but independently thereof, the spring plunger (77) and the second spring (82) being configured to be able to keep the two auxiliary arms (75,78) connected to one another as long as the spring plunger (77) is not broken, the first spring (79) being connected by one of its ends to an axis (85) which is connected to the second auxiliary arm (78) by a pivot (86), the first spring (79) abutting by its second end on the support (81), the first spring (79) surrounding said axis (85), said axis (85) passing through the support (81) and being provided with an abutment (80) which prevents the separation of said axis (85) and of said support (81), the second spring (82) being mounted between the first and the second auxiliary arms (75,78), such that:
  the actuation of the actuator (54) in either of the two linear directions generates a rotation of the first auxiliary arm (75) in one of the two rotary directions, the first auxiliary arm (75) driving the brush-holder arm (3) by means of the abutment (80) or by means of the first spring (79),
  the spring plunger (77) and the second spring (82) are configured to maintain the connection between the auxiliary arms (75,78) upon the actuation of the brush-holder arm by the actuator (54),
  the spring plunger (77) is configured to be broken by lateral or frontal forces of a certain level, exerted on the brush-holder arm, such that the brush-holder arm can temporarily pivot relative to the first auxiliary arm (75), without forcing the actuator (54).

According to a second aspect, the invention is related to sweeper comprising a frame, at least three wheels, a propulsion motor, a cabin for the driver, one or more brushes, each brush being able to perform a rotation relative to an armature mounted at the end of a brush-holder arm which extends in front of and/or at the periphery of the cabin, and waste suction and collection means, wherein each of the brush-holder arms comprises:
  two pairs of profile members, each pair comprising a top profile member and a bottom profile member, the top and bottom profile members being:
    respectively connected to the frame or to a structure connected to the frame, by a first pair of pivots, allowing the pivoting of the profile members relative to the frame about horizontal axes,
    respectively connected to the armature of the brush, by a second pair of pivots, allowing the pivoting of the profile members relative to the armature about horizontal axes,
    such that the four pivots of each pair of profile members form a deformable parallelogram, the two parallelograms having essentially the same dimensions and being situated in parallel vertical planes,
  an actuator mounted between the pairs of profile members, the actuator being configured to actuate the deformation of said parallelograms so as to raise or lower the brush in a vertical plane,
and wherein the actuator is configured such that when the brush is raised to the maximum, the actuator is positioned below the top profile members of said pairs of profile members,
characterized in that:
  the bottom pivots of each of the pairs of profile members are arranged backward in a horizontal direction relative to the top pivots,
  each of the top and bottom profile members of each pair of profile members is formed by two straight parts secured to one another, a first part present on the side of the armature of the brush which is essentially oriented horizontally when the brush is raised to the maximum, and a second part present on the side of the frame which is inclined downward when the brush is raised to the maximum.

According to an embodiment of the second aspect of the invention, the actuator is a hydraulic actuator comprising a cylinder pivotably connected to the frame or to a structure connected to the frame by a first pivot and a piston which is secured to a rod, said rod being pivotably connected to the armature of the brush by a second pivot, the piston dividing the cylinder into two compartments, a first compartment present on the side of the frame and a second compartment present on the side of the brush, and wherein:
  the first pivot of the actuator is situated above said first pairs of pivots of the profile members,
  the second pivot of the actuator is situated between said second pairs of pivots of the profile members.

According to a specific embodiment of the second aspect of the invention, the actuator is a hydraulic actuator comprising a cylinder pivotably connected to the frame or to a structure connected to the frame by a first pivot and a piston which is secured to a rod, said rod being pivotably connected to the armature of the brush by a second pivot, the piston dividing the cylinder into two compartments, a compartment present on the side of the frame and a compartment present on the side of the brush, wherein the actuator is connected to a hydraulic fluid tank and to a hydraulic pump and/or to an accumulator, and wherein the actuator is configured such that:
  to raise the brush, the compartment on the side of the armature is placed under hydraulic pressure, such that the brush is raised by the rod which pulls on the brush-holder arm,
  to lower the brush, the pressure in the compartment on the side of the armature is reduced, such that the weight of the brush-holder arm, of the armature and of the brush lower the brush.

According to a specific embodiment, only the compartment on the side of the brush is connected to said pump. According to another embodiment, the two compartments form part of a hydraulic circuit comprising the pump, possibly one or more accumulators, and the tank.

According to a third aspect, the invention is related to a sweeper comprising a frame, at least three wheels, a propulsion motor, a cabin for the driver, one or more brushes, each brush being able to perform a rotation relative to an armature mounted at the end of a brush-holder arm which extends in front of and/or at the periphery of the cabin, and waste suction and collection means, said means comprising a suction turbine, a motor configured to drive the turbine, and a filter for filtering the sucked air, characterized in that the filter is mounted in direct contact with the turbine inlet.

The filter can be a cylindrical filter and wherein the motor, the turbine and the filter are mounted coaxially. The common axis of the motor, of the turbine and of the filter can be oriented transversely relative to the sweeper.

BRIEF DESCRIPTION OF THE FIGURES

FIGS. 6a-6c represent schematic views which show a mechanism for controlling the movement of the brushes in a horizontal plane, according to a second embodiment.

FIGS. 7a-7c represent schematic views which show how the mechanism represented in FIG. 6 is capable of absorbing lateral and/or frontal shocks.

DETAILED DESCRIPTION OF THE INVENTION

Figure 1:
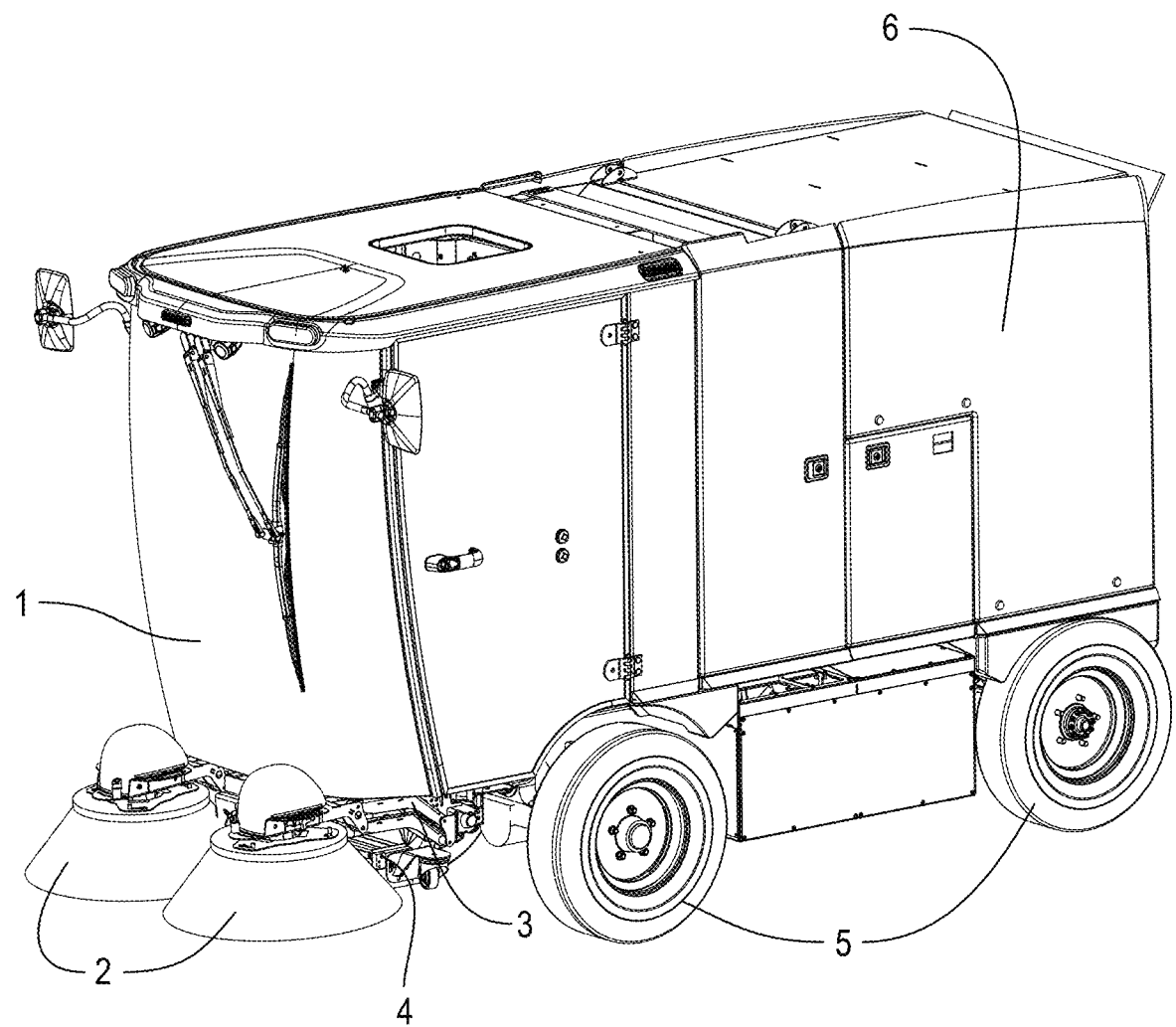
FIG. 1 represents a perspective overall view of a sweeper forming the subject of the invention.

FIG. 1 represents a general view of a sweeper which forms the subject of the invention. Represented therein are the cabin 1 of the driver, the brushes 2 mounted on the brush-holder arms 3, the suction mouth 4, the wheels 5 of the vehicle. The compartment 6 includes the suction turbine and a container for collecting the waste. The sweeper also comprises a propulsion motor which can be an electric motor or any other source of energy applicable for this kind of vehicle. The sweeper is preferably a vehicle with four wheels but can, generally, have at least three wheels.

Figure 2A:
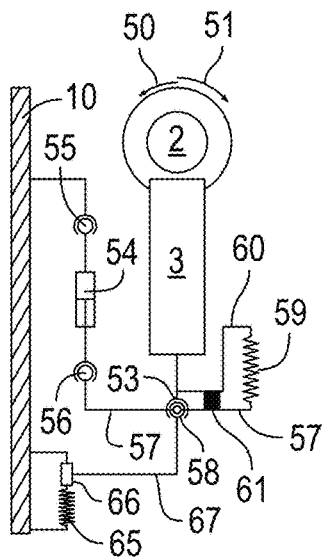
FIGS. 2a-2c represent schematic views which show, conceptually, a mechanism for controlling the movement of the brushes in a horizontal plane, according to a first embodiment of a first aspect of the invention.
Figure 2B:
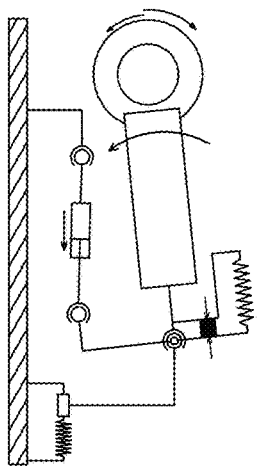
Figure 2C:
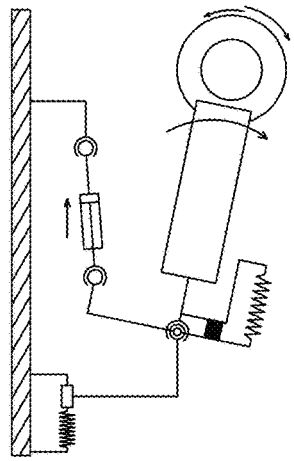

A first aspect of the invention relates to a mechanism which allows for controlling the position of the brushes 2 in the horizontal plane. The mechanism is also capable of absorbing shocks in the case of the presence of obstacles exerting an external force in one or more directions. FIGS. 2a-2c show, conceptually, the operation of the mechanism according to a first embodiment. FIG. 2a shows a top view of the right-hand side brush 2 of the sweeper. The mechanism which operates the left-hand side brush is symmetrical to the right-hand side mechanism. The brush 2 rotates in a direction 50. When the brush is in contact with the ground, its rotation generates a reaction torque 51 on the brush. The brush 2 is rotationally connected to a brush-holder arm 3 which can be constructed as shown in FIG. 13, but which is not limited to this embodiment. The brush-holder arm 3 is able to pivot about a vertical axis by a pivot 53. A linear actuator 54, for example an electrical actuator, is mounted between a first pivot 55 which is fixed with respect to the frame 10 of the sweeper and a second pivot 56 which is fixed with respect to a first auxiliary arm 57. A linear actuator is an actuator which can act in two opposing linear directions. The actuator 54 can therefore pivot at least about vertical axes relative to the frame 10 and relative to the first auxiliary arm 57. The first auxiliary arm 57 is itself able to pivot via a pivot 58 which is coaxial with the pivot 53, such that the first auxiliary arm 57 is able to pivot about the same vertical axis as the brush-holder arm 3, but independently of said brush-holder arm 3.

In the embodiment represented in FIG. 2a, the auxiliary arm 57 extends on both sides of the pivot 58. The pivot 56 is located on one side of the pivot 58. On the opposite side, a point of the first auxiliary arm 57 is connected to one of the ends of a first linear spring 59 which is prestressed by traction. The other end of the spring 59 is connected to a support 60 which is fixed to the brush-holder arm 3. An abutment 61 is mounted between the support 60 and the first auxiliary arm 57 in order to limit the approach of the arm 57 towards the support 60. Since the support 60 is fixed to the brush-holder arm 3, the spring 59 and the abutment 61 are effectively mounted between the first auxiliary arm 57 and the brush-holder arm 3. An additional spring 65 is mounted between the frame 10 and a floating support 66 which can be displaced only in a horizontal direction. Said floating support 66 is connected to a support arm 67. The first auxiliary arm 57 and the brush-holder arm 3 are connected to the support arm 67 so that the first arm 57 and the brush-holder arm 3 can pivot (independently of one another) relative to the support arm 67. The spring 59 exerts a force so as to keep the support 60 and the arm 57 abutted at abutment 61.

The operation of the system is explained on the basis of FIGS. 2b and 2c. FIG. 2b represents the result of a command from the operator to bring the brush 2 toward the frame 10 in order to reduce the sweeping width. To do this, the operator acts using a control on the actuator 54 in order to extend the actuator. The latter will cause the first auxiliary arm 57 to pivot in the anticlockwise direction. The abutment 61 which is fixed to said arm 57 will push the assembly of the brush-holder 3 and the brush 2 which thereby also pivots in the anticlockwise direction. FIG. 2c, with respect to FIG. 2a, represents the result of a command from the operator to move the brush 2 away from the frame 10 in order to increase the sweeping width. To do this, the operator acts using a control on the actuator 54 so as to shorten the actuator. The latter will cause the first auxiliary arm 57 to pivot in the clockwise direction. The first spring 59 and the reaction torque 51 of the brush 2 will pull the brush-holder arm 3 towards the outside.

Figure 3A:
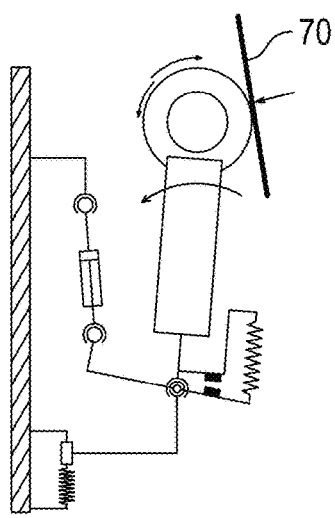
FIGS. 3a-3c represent schematic views which show how the mechanism presented in FIG. 2 is capable of absorbing lateral and/or frontal shocks.
Figure 3B:
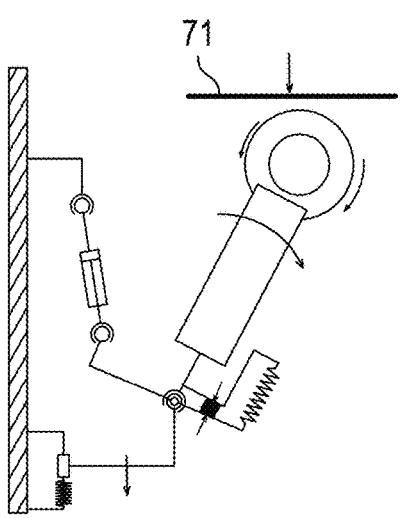
Figure 3C:
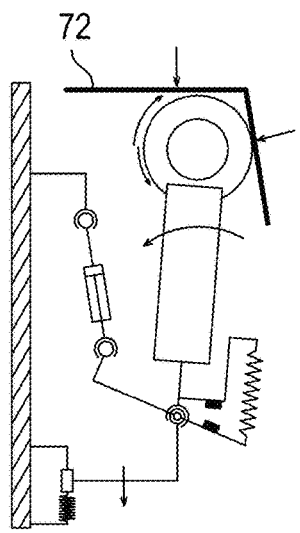

The function of the two springs 59 and 65 is also related to the absorption of shocks from obstacles encountered by the brush 2, as illustrated in FIGS. 3*a* to 3*c*. FIG. 3*a* illustrates a lateral object 70 encountered when the brush is in the position of FIG. 2*c*. This obstacle pushes back the brush-holder arm 3 and the brush 2 toward the frame 10, by forced pivoting of the brush-holder arm 3 about the pivot 53. To protect the actuator 54, the first spring 59 will extend whereas the first auxiliary arm 57 remains immobile, in order to avoid forcing of the actuator 54, and the pivot 53 will allow the rotation of the brush-holder arm 3 and of the brush 2. Once the obstacle is cleared, the first spring 59 and the reaction torque 51 will return the brush-holder arm 3 to its initial position without the intervention of the operator.

FIG. 3*b* illustrates the presence of a frontal obstacle 71. This obstacle will exert a dual load on the pivots 53 and 58: a rotational load in the clockwise direction of the arm 57 and of the support 60 (via the abutment 61) and a translational load of the support arm 67 regulated by the spring 65. This mechanism protects the actuator 54. The retraction of the "arm 57-arm 67-brush-holder arm 3" assembly gives the operator time to react and stop the machine. Preferably, a sensor (not represented) is placed at the level of the spring 65. This sensor can control the stopping of the machine if the operator does not react quickly enough.

FIG. 3*c* illustrates the presence of an obstacle 72 both at the front and at the side. This obstacle will push the brush-holder arm 3 back towards the rear and also push it towards the frame 10. To protect the actuator 54, the spring 65 will be compressed to allow the brush-holder arm 3 to retract and the spring 59 will be extended to allow the brush-holder arm 3 to return toward the frame 10. This retraction of the "arm 57-arm 67-brush-holder 3" assembly gives the operator time to react and stop the machine. Preferably, the sensor already described can also control the stopping of the machine if the operator does not react quickly enough.

Figure 4:
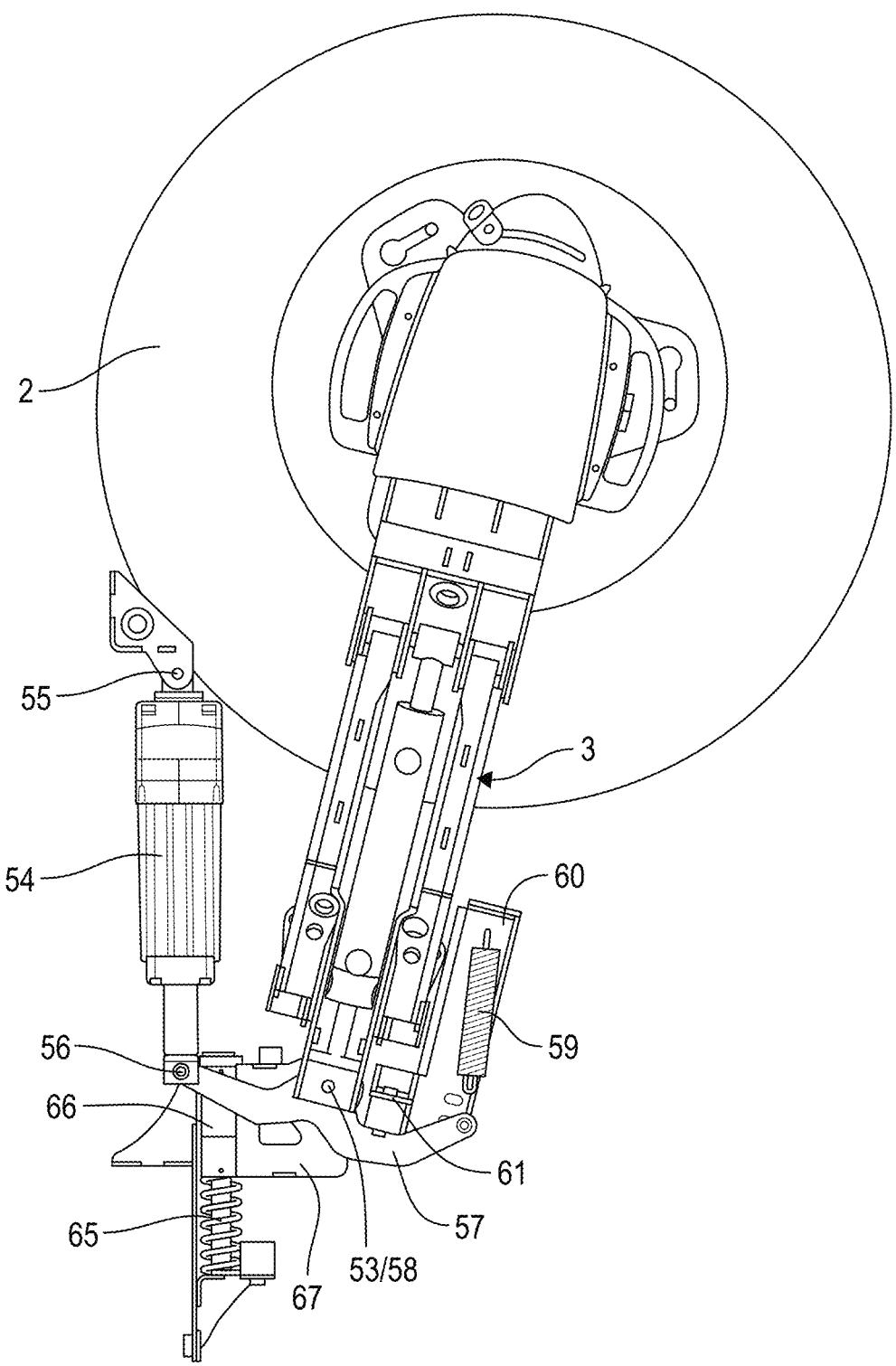
FIG. 4 represents an embodiment of a mechanism having the functionalities demonstrated in FIGS. 2 and 3.
Figure 13A:
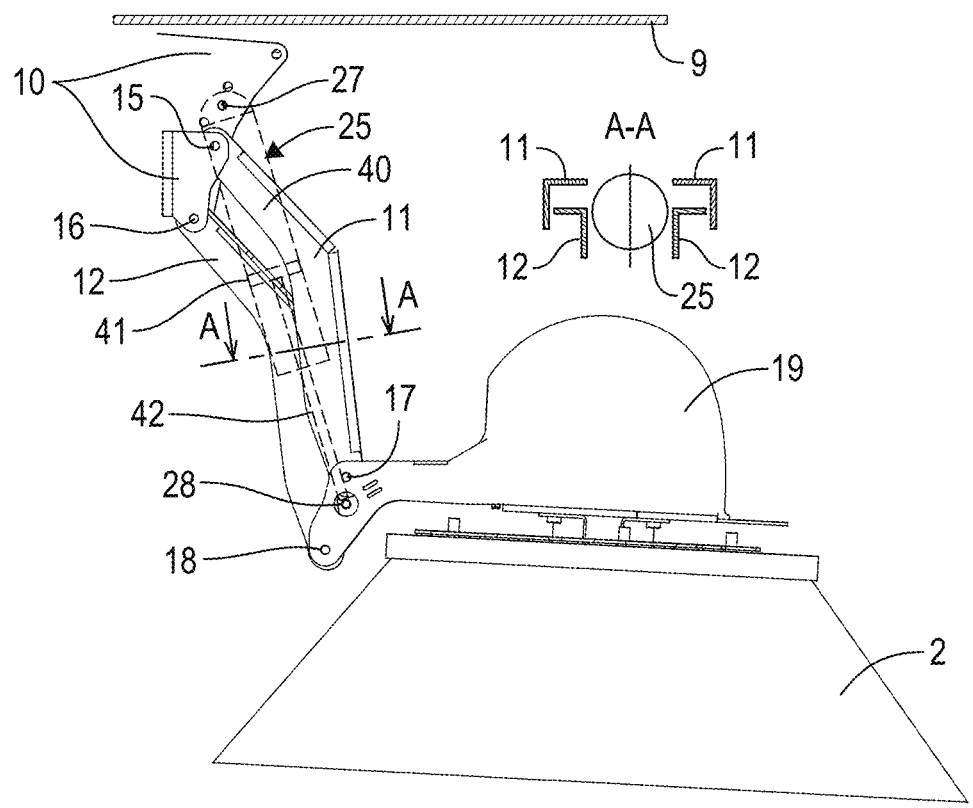
FIGS. 13a and 13b represent profile views of the brush-holder arm and of its mechanism in raised and lowered position in a vertical plane, according to a second aspect of the invention.
Figure 13B:
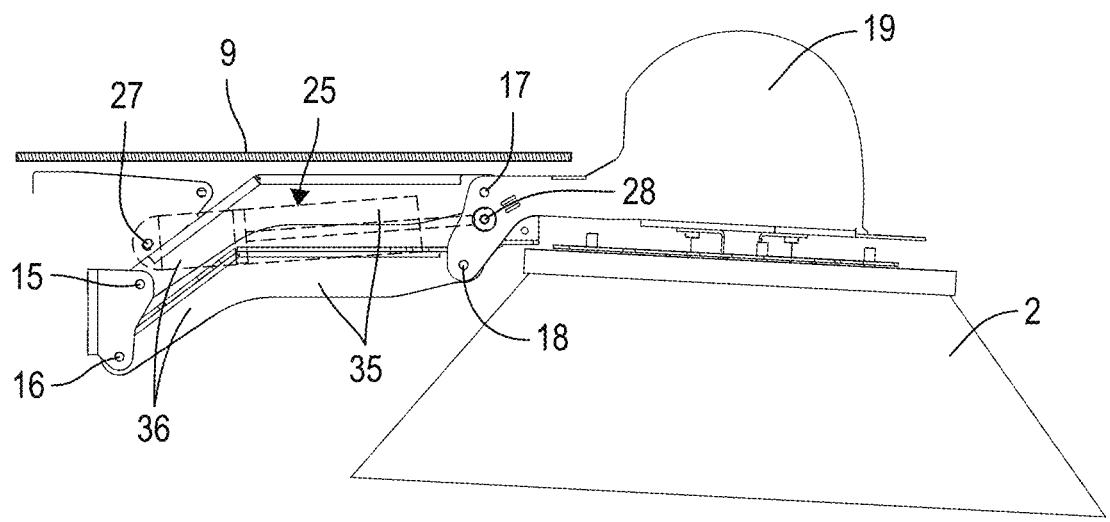

FIG. 4 shows a mechanism having the functionalities described on the basis of FIGS. 2 and 3. The same numeric references indicate the same components of the mechanism described above. The brush-holder arm 3 is constructed as represented in FIGS. 13*a* and 13*b*.

Figure 5A:
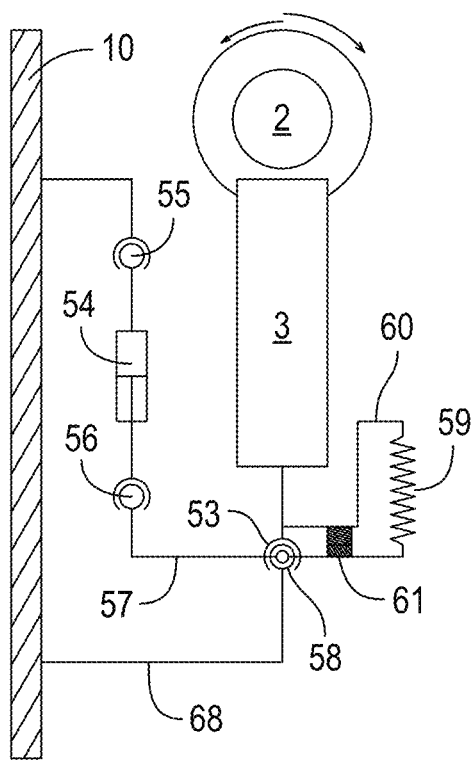
FIGS. 5a and 5b represent schematic views which show the mechanisms which have only one of the anti-shock functionalities illustrated in FIGS. 2 and 3.
Figure 5B:
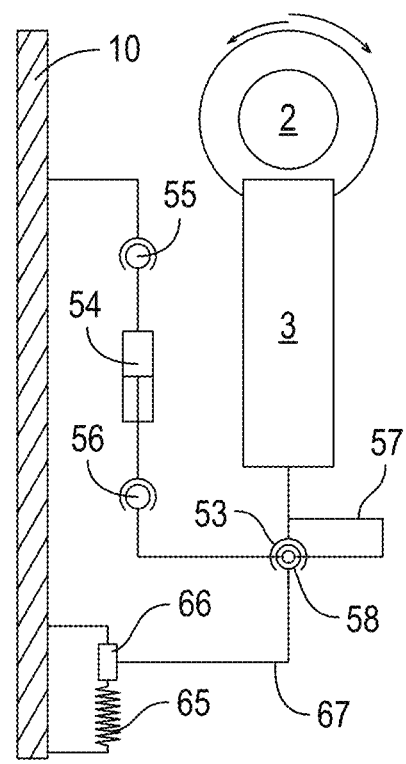

The invention relates also to a sweeper provided with at least one of the springs 59 or 65. These embodiments are illustrated in FIGS. 5*a* and 5*b*. In the mechanism of FIG. 5*a*, the brush-holder arm 3 and the first auxiliary arm can pivot relative to a fixed arm 68, which does not allow the absorption of frontal impacts as described above. The lateral shocks will nevertheless be absorbed by the intervention of the first spring 59, as described. In the mechanism of FIG. 5*b*, the first auxiliary arm 57 is fixed to the brush-holder arm 3, which does not allow the absorption of lateral shocks in the manner described above. The frontal shocks will nevertheless be absorbed by the intervention of the spring 65, as described.

A second embodiment is illustrated in FIGS. 6 and 7. The brush 2 is visible, held by the brush-holder arm 3 configured to pivot about a vertical axis at the pivot 53. Once again, a linear actuator 54 is mounted between the pivots 55 and 56, the latter connecting the actuator 54 to a first auxiliary arm 75. One end of the arm 75 is connected to the pivot 56, and the arm 75 can also rotate about the pivot 76, therefore about the same vertical axis as the brush-holder arm 3, but independently of the brush-holder arm 3. A spring plunger 77 is fixed to the other end of the auxiliary arm 75, on the other side, relative to the pivot 56, of the pivot 76. A second auxiliary arm 78 has a pivot 76' allowing a rotation about the same vertical axis of rotation as the first arm 75 and the brush-holder arm 3 but independently thereof. The second auxiliary arm 78 is kept in contact with the spring plunger 77, serving as abutment, by virtue of the action of the first spring 82 connecting the arms 75 and 78. The first spring 82 is prestressed by traction. A rod 85 is connected at one of its ends to the second auxiliary arm 78 by a pivot 86 and this rod 85 passes through a support 81 which is fixed to the brush-holder arm. The rod 85 can slide relative to the support 81. The rod 85 is provided with a second linear spring 79 making it possible to separate the arm 78 from the support 81 and with a retaining block 80 at its other end preventing the decoupling of the arm 78 and of the support 81. The rod 85 extends inside the second spring 79 which is attached to the rod 85 in to the vicinity of the pivot 86 and which abuts against the support 81. The abutment obtained by virtue of the spring plunger 77 is eliminated as soon as an excessive rotational load in the clockwise direction is applied by the arm 78 on the spring plunger 77. The axis of the pivots 76, 76' and 53 is fixed to the frame 10, which is symbolized by the presence of a fixed arm 83. The second spring 79 is slightly prestressed by compression in the position of FIG. 6*a*. The spring plunger can also be fixed to the auxiliary arm 78 while retaining the same functionality.

In the present invention, an abutment represents a structure comprising two parts which form a connection that is fixed or not as a function of the force exerted on one of the parts relative to the other. In its conventional form, hereinafter called "push abutment", as represented in FIGS. 2 and 3, the parts of the abutment are mounted against each other, such that the fixed connection is lost as soon as the parts are subjected to a force which moves the parts away from one another. Another form of abutment that can be used in the invention is a spring abutment, in which the two parts are disconnected as soon as they are subjected to a force which moves them apart from one another, like for a push abutment, and in which, in the opposite direction, the parts stay together, provided that the force exerted on one part relative to the other remains below a predefined value, this value being determined by a spring. The spring plunger 77 is only one example of an abutment of the latter type.

FIG. 6*b*, with respect to FIG. 6*a*, represents the result of a command from the operator to move the brush 2 towards the frame 10 in order to reduce the sweeping width. To do this, the operator acts by using a control over the actuator 54 so as to extend the actuator. The latter will pivot the first auxiliary arm 75 in the anticlockwise direction. The second arm 78 is itself driven by the spring plunger 77 attached to the first arm 75. The brush-holder arm 3 will itself be pushed by the second spring 79, which exerts a force on the support 81.

FIG. 6*c*, with respect to FIG. 6*a*, represents the result of a command from the operator to separate the brush from the frame in order to increase the sweeping width. To do this, the operator acts using a control over the actuator 54 so as to shorten the actuator. The latter will pivot the first auxiliary arm 75 in the clockwise direction. The second auxiliary arm 78 is itself kept in contact with the spring plunger 77 by the spring 82 connecting the arms 78 and 75. The brush-holder arm 3 will be pulled by the retaining block 80, which exerts a force on the support 81.

FIGS. 7a-7c represent the reactions of the mechanism controlling the brush-holder arm 3 when obstacles occur, the starting situation being represented by FIG. 6c. FIG. 7a illustrates the presence of a lateral obstacle 90. This obstacle will push back the brush-holder arm 3 towards the frame 10. To protect the actuator 54, the spring plunger 77 is configured to be disconnected by virtue of the force exerted by the obstacle. The second auxiliary arm 78 momentarily loses contact with the spring plunger 77, which allows the arm 78, the rod 85, the support 81 and the brush-holder arm 3 to pivot independently of the first arm 75. The first spring 82 will be extended. Once the obstacle is cleared, the spring 82 will bring the second auxiliary arm 78 into contact with the spring plunger 77. With the aid of the reaction torque 51, the second arm 78, when returning, will pull, with the rod 85 and the retaining block 80, the brush-holder arm 3 outwards to bring it back to its initial position without the intervention of the operator.

FIG. 7b illustrates the start of the reaction of the mechanism to the presence of an obstacle represented here by a post 91, which will separate the brush-holder arm 3 from the frame 10. To protect the actuator 54, the second spring 79 is compressed by the support 81 to allow the brush-holder arm 3 to be separated from the frame 10. Both of the auxiliary arms 75 and 78 remain immobile. FIG. 7c illustrates the continuation of the reaction of the mechanism. At a moment, the force exerted by the compressed second spring 79 on the second auxiliary arm 78 will break the spring plunger 77 and thereby separate the arms 75 and 78, allowing the second arm 78 to pivot backwards while the first arm 75 remains immobile. In this way, the brush-holder arm 3 is turned sufficiently backward to protect the mechanism from any damage. A sensor (not represented) may be placed at the spring plunger 77. This sensor can control the stopping of the machine if the operator does not react quickly enough. To return the brush-holder arm 3 to a working position, the operator must manually pivot it toward the frame 10. By its movement, the brush-holder arm 3 will pull back the second arm 78. Once the latter has passed the spring plunger 77, the mechanism will be once again operational.

Figure 8A:
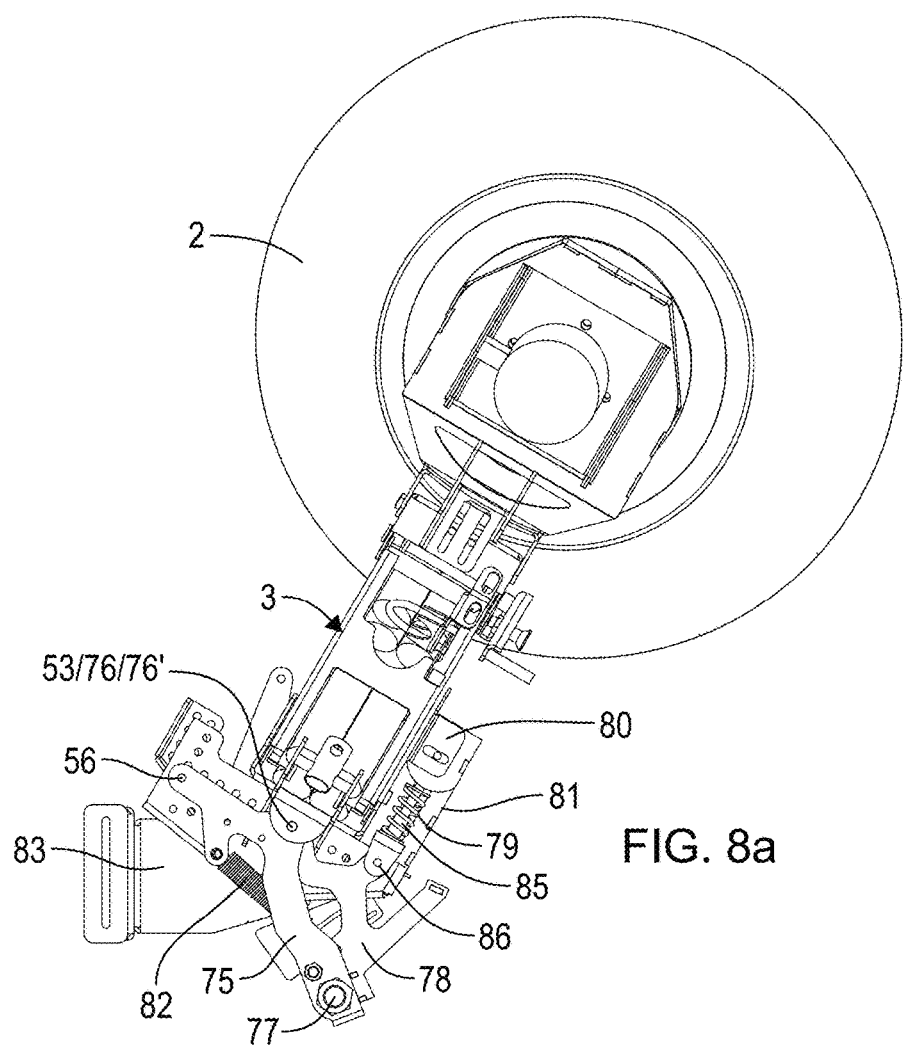
FIGS. 8a and 8b represent schematic views which show a mechanism which has the functionalities illustrated in FIGS. 6 and 7.
Figure 8B:
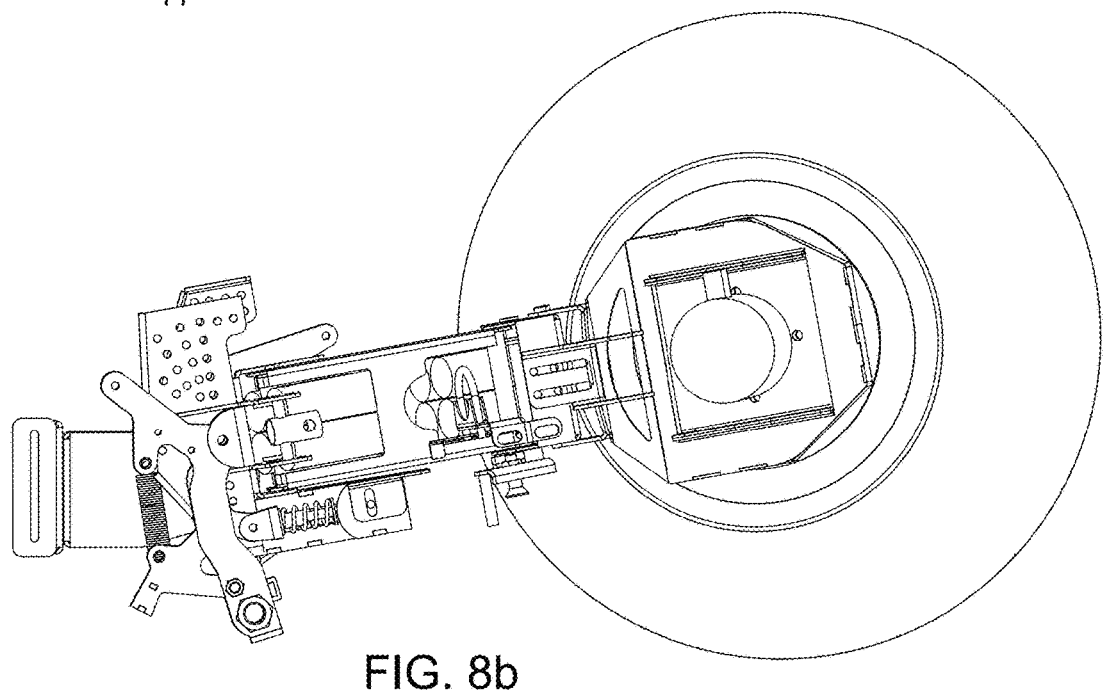

FIGS. 8a and 8b show a mechanism having the functionalities illustrated in FIGS. 6 and 7. The two situations shown in FIGS. 8a and 8b correspond to the situations represented in FIGS. 7b and 7c. The actuator 54 is not represented therein. It can be seen that the auxiliary arms 75 and 78 are different, but that the functionality described above is indeed taken up by the mechanism shown. It can also be seen that the spring plunger 77 serves as abutment for the arms 75 and 78 by exerting a vertical force. Finally, it can be seen that the rod 85 which is surrounded by the second spring 79 is not fixed to the second arm 78 but that this rod can pivot relative to the second arm via the pivot 86. The mechanism described above on the basis of FIGS. 6 to 8 can be combined in the same machine with one of the mechanisms shown in FIGS. 2 to 5.

Figure 9A:
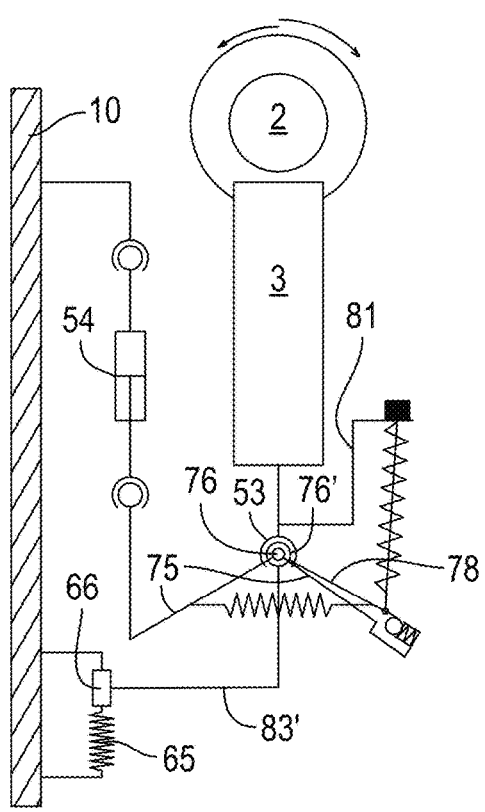
FIG. 9 represents the mechanism of FIG. 6, provided with a spring which absorbs frontal shocks.
Figure 9B:
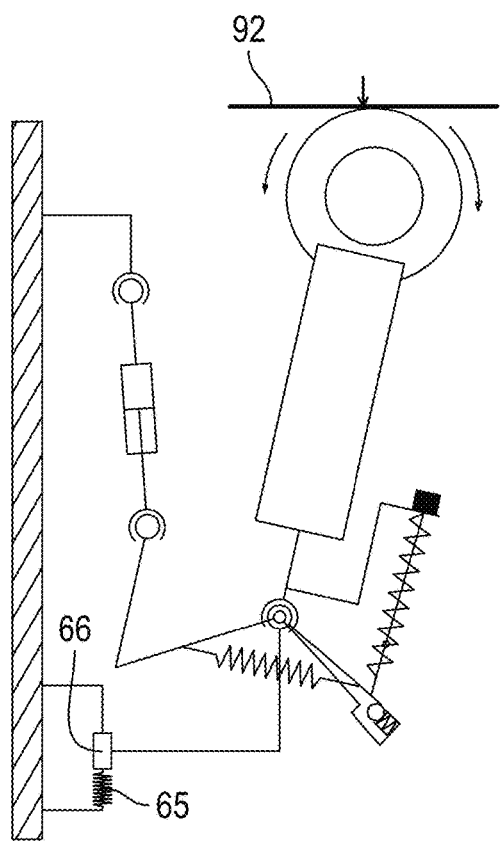

FIGS. 9a and 9b represent the embodiment of FIGS. 6 and 7, provided with an additional spring 65 between the frame 10 and a floating support 66 which can be displaced only in a horizontal direction and to which a support arm 83' is fixed. The first auxiliary arm 75, the second auxiliary arm 78 and the brush-holder arm 3 are connected to the support arm 83' such that the first arm 75, the second arm and the brush-holder arm 3 can pivot (independently of one another) relative to the support arm 83'. The functionality of the spring 65 is the same as for the embodiment of FIGS. 2 and 3, in particular the absorption of frontal shocks and of shocks which are simultaneously frontal and lateral. As illustrated in FIG. 9b, a frontal obstacle 92 will exert a dual load on the pivots 53, 76 and 76': a rotational load in the clockwise direction of the arms 75, 80 and 78 and a translational load of the arm 83' regulated by the spring 65. This mechanism protects the actuator 54. The retraction of the "arm 75-arm 80/78-brush-holder arm 3" assembly gives the operator time to react and stop the machine. Preferably, a sensor (not represented) is placed at the spring 65. This sensor can control the stopping of the machine if the operator does not react quickly enough.

The embodiment shown in FIGS. 9a and 9b is also capable of absorbing shocks generated by an obstacle both frontal and lateral, such as the obstacle 72 shown in FIG. 3c. This obstacle will push back the brush-holder arm 3 towards the rear but will also push it towards the frame 10. To protect the actuator 54, the spring 65 will be compressed to allow the brush-holder arm 3 to retract. The spring plunger 77 allows the spring 82 to be extended to allow the brush-holder arm 3 to return to the frame 10. This retraction of the "arm 75-arm 78-brush-holder 3" assembly gives the operator time to react and stop the machine. Preferably, the sensor already described can also control the stopping of the machine if the operator does not react quickly enough.

In FIGS. 10 and 11, a third embodiment is represented of a mechanism according to the invention which allows the position of the brushes 2 to be adjusted in the horizontal plane. Once again, the brush 2 is visible, held by the brush-holder arm 3, which is configured to pivot about a vertical axis at the pivot 53. As previously, the directions of the rotation of the brush 2 and of the reaction force are indicated by the references 50 and 51. Once again, a linear actuator 54 is mounted between the pivots 55 and 56, the latter connecting the actuator 54 to a first auxiliary arm 110. The arm 110 comprises two parts 110a and 110b fixed to one another at a pivot 111 which is coaxial with the pivot 53. In other words, the arm 110 can pivot about the same vertical axis as the brush-holder arm 3, but independently of said brush-holder arm 3. The first part 110a is connected to the pivot 56. A second auxiliary arm 112 has been provided which can pivot via a pivot 113 which is coaxial with the pivots 53 and 111. The second arm 112 is therefore able to pivot about the same vertical axis as the first auxiliary arm 110 and the brush-holder arm 3 but independently thereof. In the embodiment of FIG. 10, the second auxiliary arm 112 comprises a main part 112a and a transverse part 112b. A push abutment 114 is mounted between the main part 112a and the brush-holder arm 3. One end of the transverse part 112b is connected to the brush-holder arm 3 by a first linear spring 115, prestressed by traction. The other end of the transverse part 112b is connected to a rod 116 by a pivot 117. The rod 116 is located inside a second linear spring 118, one end of which is attached to the rod 116 in the vicinity of the pivot 117 and the other end of which abuts on the second part 110b of the first auxiliary arm 110. The second spring 118 is prestressed by compression. The rod 116 is mounted to be able to slide relative to the second part 110b of the first arm 110 and it is provided with a retaining block 119 which limits the movement of the rod 116 relative to said second part 110b of the first arm. The axis of the pivots 53, 111 and 113 is fixed to the frame 10, which is symbolized by the presence of a fixed arm 120. According to an equivalent embodiment, the second arm 112 can comprise a single part, in particular the part 112a, connected directly to the rod 116 and to the spring 115.

Figure 10C:
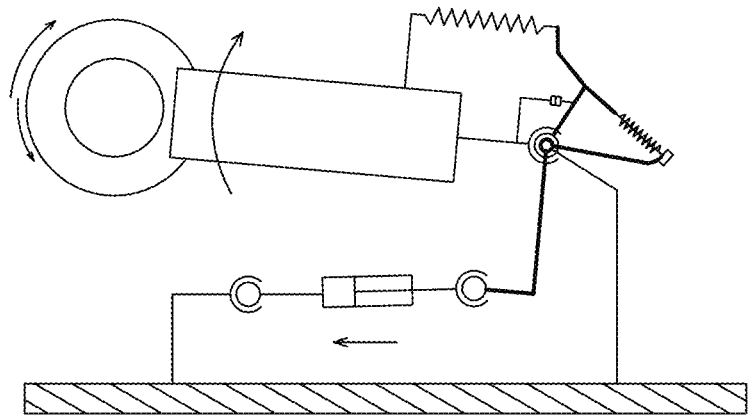
FIGS. 10a-10c represent schematic views which show a mechanism for controlling the movement of the brushes in a horizontal plane, according to a third embodiment.
Figure 10B:
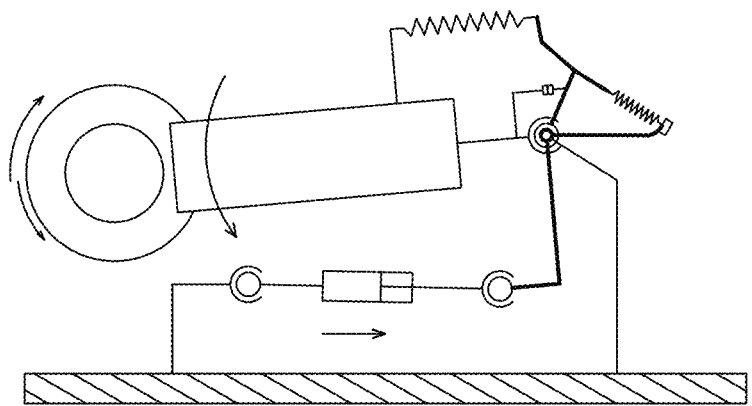
Figure 10A:
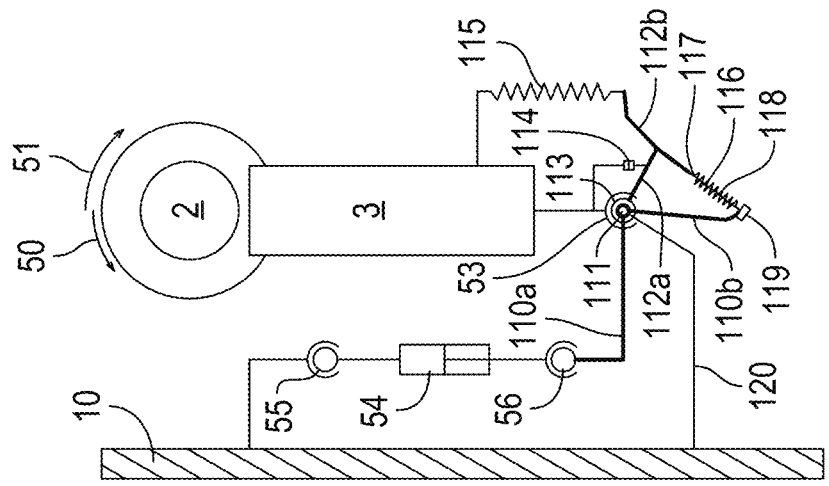

FIG. 10b, with respect to FIG. 10a, represents the result of a command from the operator to return the brush 2 toward the frame 10 in order to reduce the sweeping width. To do this, the operator acts using a control on the actuator 54 so as to extend the actuator. The latter will pivot the first auxiliary arm 110 in the anticlockwise direction. The first arm 110 will push the second arm 112 via the second spring 118. The second arm 112 in turn will push the brush-holder arm 3 via the abutment 114.

FIG. 10c, with respect to FIG. 10a, represents the result of a command from the operator to move the brush 2 away from the frame 10, in order to increase the sweeping width. To do this, the operator acts using a control on the actuator 54 so as to shorten the actuator. The latter will pivot the first auxiliary arm 110 in the clockwise direction. The first auxiliary arm 110 will pull the second auxiliary arm 112 towards itself via the rod 116 inside the second spring 118, and its retaining block 119. The first spring 115 exerts a pulling force, which has the effect of pulling the brush-holder arm 3 towards the outside, assisted by the reaction torque 51. During this movement, the position of the brush-holder arm 3 relative to the second auxiliary arm 112 is maintained by the abutment 114.

Figure 11C:
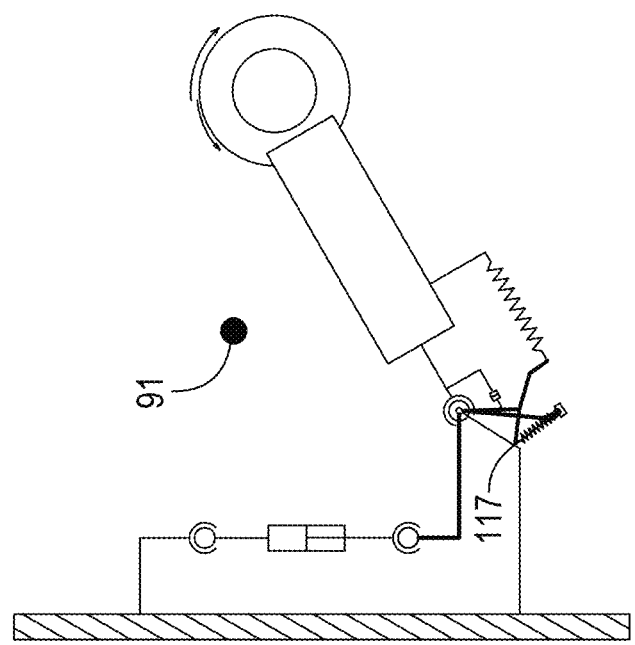
FIGS. 11a-11c represent schematic views which show how the mechanism represented in FIG. 9 is capable of absorbing lateral and/or frontal shocks.
Figure 11B:
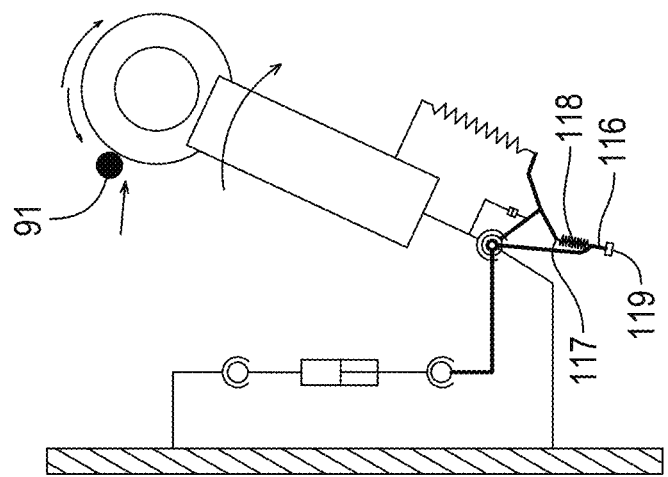
Figure 11A:
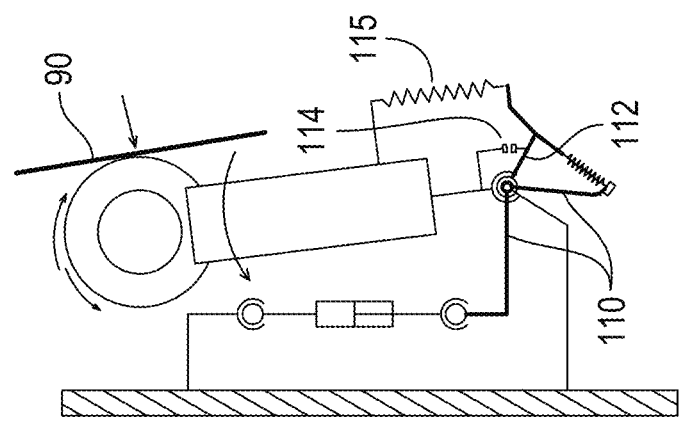

FIGS. 11a-11c represent the reactions of the mechanism controlling the brush-holder arm 3 when obstacles occur, starting from the situation represented in FIG. 10a. FIG. 11a illustrates the presence of a lateral obstacle 90. This obstacle will push back the brush-holder arm 3 towards the frame 10. The brush-holder arm 3 will pivot in the direction opposite to the obstacle, releasing the abutment 114 and extending the spring 115. The auxiliary arms 110 and 112 remain immobile, so as to protect the actuator 54. Once the obstacle has been cleared, the spring 115 will take the brush-holder arm 3 back to abutment 114, without the intervention of the operator.

FIG. 11b illustrates the start of the reaction of the mechanism faced with the presence of an obstacle, represented by a post 91, which separates the brush-holder arm 3 from the frame 10. The brush-holder arm 3, via the abutment 114, will pivot the second auxiliary arm 112 backwards. This movement is made possible by the presence of the pivot 117 between the second arm 112 and the rod 116 inside the second spring 118. The first auxiliary arm 110 remains immobile since there is no actuation of the actuator 54. Consequently, the pivoting of the second arm 112 compresses the spring 118, as illustrated in FIG. 11b. With the angle increasing (FIG. 11c), the spring 118 goes beyond its minimum point and will expand pulling the second arm 112 backwards. By virtue of the first spring 115, the brush-holder arm 3 will follow it and disengage from the obstacle. The brush-holder arm 3 is thereby brought backwards sufficiently to protect the mechanism from any damage. Once the obstacle has been cleared, the operator will bring the brush-holder arm 3 back forward. The spring 118 is first compressed and will be reset once it has gone beyond its minimum position. The mechanism will once again be operational.

Figure 12A:
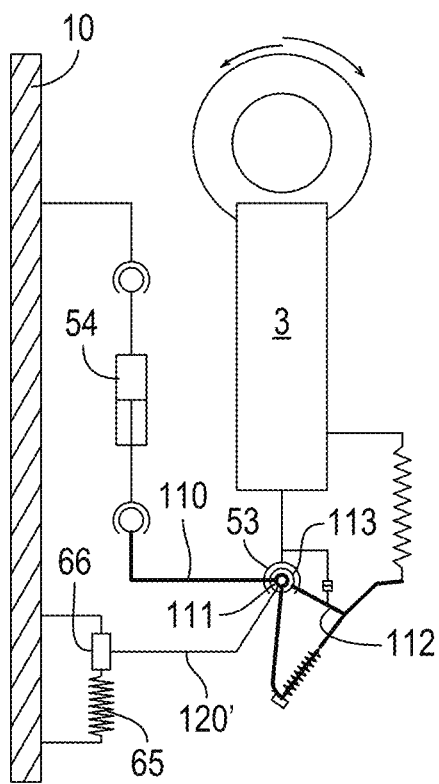
FIG. 12 represents the mechanism of FIGS. 10 and 11, provided with a spring which absorbs frontal shocks.
Figure 12B:
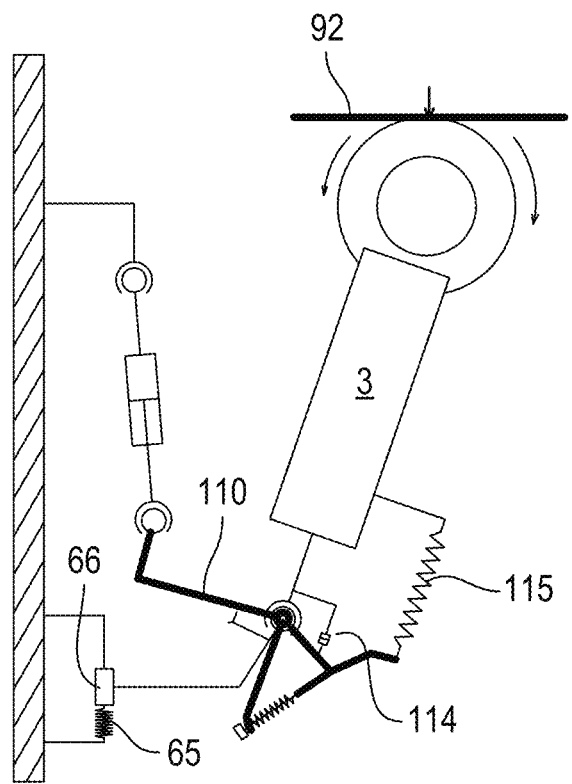

FIGS. 12a and 12b represent the embodiment of FIGS. 10 and 11, provided with an additional spring 65 between the frame 10 and a floating support 66 which can be displaced only in a horizontal direction and to which a support arm 120' is fixed. The first auxiliary arm 110, the second auxiliary arm 112 and the brush-holder arm 3 are connected to the support arm 120' such that the first arm 110, the second arm 112 and the brush-holder arm 3 can pivot (independently of one another) relative to the support arm 120'. The functionality of the spring 65 is the same as for the embodiments of FIGS. 2, 3 and 9, in particular the absorption of frontal shocks and of shocks which are simultaneously frontal and lateral. As illustrated in FIG. 12b, a frontal obstacle 92 exerts a dual load on the pivots 53, 111 and 113: a rotational load in the clockwise direction of the arms 110 and 112 and a translational load of the arm 120' regulated by the spring 65. This mechanism protects the actuator 54. The retraction of the "arm 110-arm 112-brush-holder arm 3" assembly gives the operator time to react and stop the machine. Preferably, a sensor (not represented) is placed at the level of spring 65. This sensor can control the stopping of the machine if the operator does not react quickly enough.

The embodiment shown in FIGS. 12a and 12b is also capable of absorbing shocks generated by an obstacle that is both frontal and lateral, such as the obstacle 72 shown in FIG. 3c. This obstacle will push back the brush-holder arm 3 towards the rear but also pushes it towards the frame 10. To protect the actuator 54, the spring 65 is compressed to allow the brush-holder arm 3 to retract. The spring 115 is extended to allow the brush-holder arm 3 to return towards the frame 10. This retraction of the "arm 110-arm 112-brush-holder 3" assembly gives the operator time to react and stop the machine. Preferably, the sensor already described can also control the stopping of the machine if the operator does not react quickly enough.

An element in common between the embodiments described above is the presence of a first auxiliary arm (57,75,110), a first spring (59,82,115), preferably a linear spring prestressed by traction, and an abutment (61,77,114). The first auxiliary arm may have different forms depending on the embodiment. Independently of the embodiment, the first auxiliary arm is connected to the brush-holder arm 3 by the first linear spring and by the abutment which can take the form of a push abutment or of a spring abutment, for example a spring plunger. The first spring and the abutment are configured to maintain a constant position of the brush-holder arm relative to the first auxiliary arm upon the actuation of the actuator 54 in either one of the linear directions, said actuation generating a rotation of the assembly of the first auxiliary arm and of the brush-holder arm in one of the two rotational directions about an essentially vertical axis. In the case of a lateral external force which pushes the brush-holder arm towards the interior of the sweeper, the first spring will allow a pivoting of the brush towards the frame, without pivoting of the first auxiliary arm, in order to avoid forcing the actuator 54. In a number of embodiments, the system further comprises a second auxiliary arm (78,112) and a second spring (79,118), preferably a linear spring prestressed by compression, configured to allow the absorption of lateral forces, which tend to move the brush-holder arm away from the frame of the sweeper, without forcing the actuator 54. The spring 65 and the floating support 66 can be added to any embodiment according to the invention, for the absorption of frontal shocks and of shocks which are simultaneously frontal and lateral.

The term "pivot" is used several times in this description. The pivots 53, 58, 76, 76', 111 and 113 are pivots which allow the rotation of the respective elements, in particular the brush-holder arm 3, the first auxiliary arm (57, 75, 110) and the second auxiliary arm (78, 112) about an essentially vertical axis. The invention does not however exclude embodiments in which this axis would be free to pivot in a limited way about one or more axes which are transverse to the essentially vertical axis, nor embodiments in which the elements cited above would have a degree of flexibility of movement relative to the essentially vertical axis. One or more of the pivots 55, 56, 86 and 117 can be realized as pivots allowing a rotation about an essentially vertical axis, or as universal joints, that is to say pivots allowing a rotation about several axes.

According to a second aspect of the invention, the brush-holder arms 3 in a sweeper according to the invention are constructed as illustrated in FIGS. 13*a* and 13*b*, which represent one of said brush-holder arms in its two extreme positions: lowered to the maximum (FIG. 13*a*) and raised to the maximum (FIG. 13*b*) relative to the floor 9 of the cabin 1. It can be seen that the brush-holder arm is formed by two pairs of profile members, each one of the pairs comprising a top profile member 11 and a bottom profile member 12. At one end, the profile members of each pair are pivotably connected to the frame 10 of the sweeper by pivots 15 and 16. At the other end, the profile members of each pair are pivotably connected by pivots 17 and 18 to an armature 19 which holds the brush 2. The brush 2 can rotate about its central axis relative to said armature 19 which comprises an electric motor for actuating the rotation of the brush. The pivots 15, 16, 17, 18 of each pair of profile members form two parallelograms of the same dimensions and which are deformable in two parallel vertical planes, such that the deformation of these parallelograms realises the displacement of the brush 2 in the vertical plane. The deformation of the parallelograms is actuated by the weight of the brush-holder arm 3 and by an actuator 25 which is pivotably connected on one side to the frame 10 by a first pivot 27 and on the other side to the armature 19 of the brush by a second pivot 28. The parallelogram has the advantage of keeping the relative position of the brush constant relative to the floor. In the embodiment represented in the figures, the actuator 25 is a hydraulic actuator. Other types of actuators such as electrical actuators can also be used.

When the brush 2 is raised to the maximum (FIG. 13*b*), the actuator 25 does not exceed the height of the top profile members 11. This construction is therefore relatively compact in the vertical direction, which makes it possible to lower the level of the floor 9 of the cabin compared to the existing sweepers. This therefore makes it possible to construct a more voluminous cabin without changing the height of the machine. In the embodiment represented in FIG. 2, the pivot 27 which connects the actuator 25 to the frame 10 is located higher than pivots 15 and 16 of each pair of profile members. The pivot 28 which connects the actuator 25 to the armature 19 of the brush is located between the pivots 17 and 18 of each pair of profile members (seen in vertical direction). Furthermore, as represented in FIG. 2*b* (in the position of the brush raised to the maximum), the profile members comprise a horizontal part 35 toward the brush and a part inclined downward 36 toward the frame 10, such that the pivots 15 and 16 are located lower than the pivots 17 and 18. This construction allows the actuator 25 to remain essentially centered between the four profile members during most of the trajectory of the brush.

Still as represented in FIG. 13, the lower pivots 16 and 18 are located backward in a horizontal direction relative to the respective top pivots 15 and 17. This construction allows a larger downward trajectory of the brush compared to the situation where the pivots 15-16 and 17-18 are located on the same vertical lines.

Preferably, the profile members 11 and 12 have a section as illustrated by the cross-sectional view represented in FIG. 13*a*. The section of the profile members is shaped as an angle bracket. The top profile members 11 of each pair are mounted such that the open space of the angle bracket is directed downward, which allows the bottom profile members 12 to be fitted into said open space of the top profile members 11. Other forms of interlocking sections of the profile members may be envisaged. This configuration increases the possible trajectory of the brushes. This is an additional element that makes it possible to reduce the vertical space (or height) of the parallelogram.

Advantageously, when the actuator 25 is a hydraulic actuator, the actuator is actuated as follows: the actuator comprises a cylinder 40 and a piston 41, the cylinder being pivotably connected to the frame 10 by a first pivot 27, the piston 41 being fixed to a rod 42 which is pivotably connected to the armature 19 of the brush by a second pivot 28. The piston therefore divides the cylinder into two compartments, one compartment present on the side of the frame 10 and one compartment present on the side of the brush 2.

The sweeper comprises hydraulic pressurizing means for the actuator 25. As known from the state of the art, these means may comprise a hydraulic pump, one or more hydraulic accumulators and a hydraulic fluid tank. According to a first embodiment, only the compartment present on the side of the brush 2 is connected to the tank by the pump and/or by an accumulator. To raise the brush-holder arm 3, this compartment is pressurized. To lower the arm, the pressure in this compartment is reduced such that the weight of the brush-holder arm 3 lowers the arm. When the brushes are in contact with the ground, the pressure is maintained at a level which prevents the full weight of the arms from bearing on the brushes, which would increase the wear of the brushes. According to another embodiment, the two compartments are included in a hydraulic circuit. The second compartment (on the side of the frame) is, in this case, connected to the return of the tank, to have a light pressure which can stabilize the movements of the actuator.

In each of the embodiments described above, the rod 42 of the actuator 25 will pull the arm 3 upwards when the pressure is increased in the compartment of the actuator 25 on the side of the brush. This mode of operation allows an effective control of the force exerted by the brush 2 on the ground. More particularly, the control allows said force to remain stable even when the sweeper is operating in uneven terrain. An automatic control system is preferably provided to adjust the pressure in the compartments as a function of a predetermined pressure that the brushes should exert on the ground.

Instead of being connected directly to the frame 10 by the pivots 15 and 16 (for the profile members) and 27 (for the actuator), the brush-holder arm 3 described above could be connected to a structure which is itself connected to the frame, pivotably or otherwise, for example as illustrated in FIGS. 2 to 12.

Figure 14:
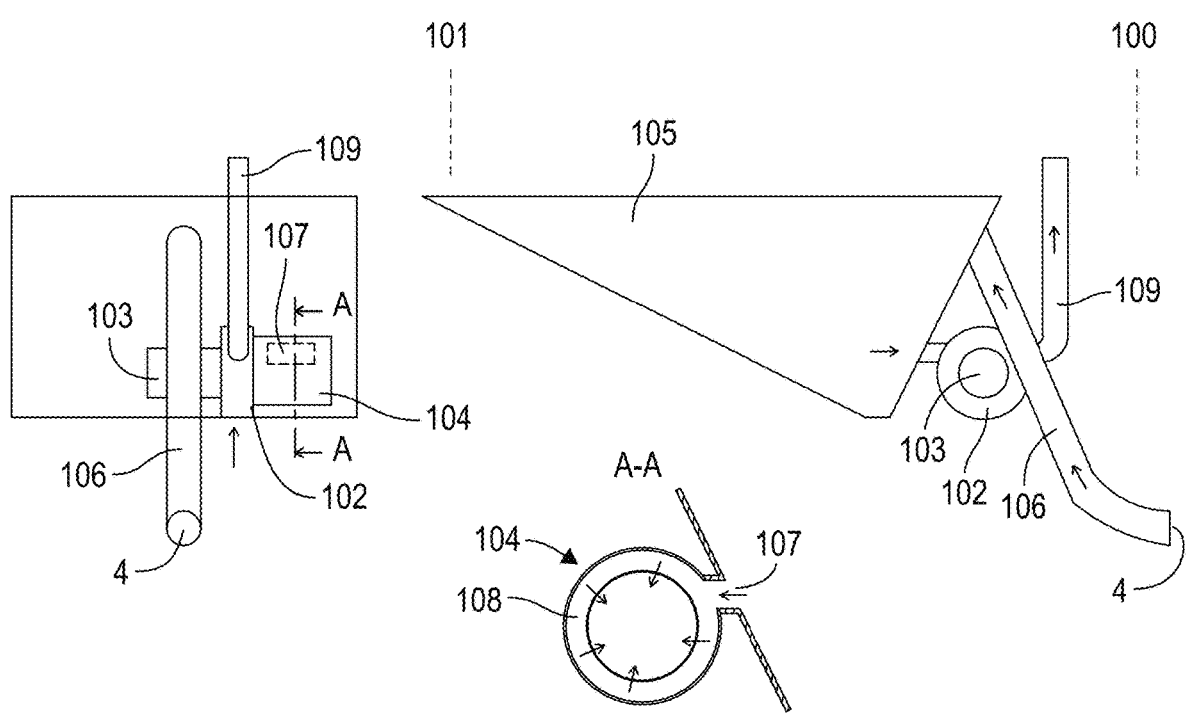
FIG. 14 represents an arrangement of the suction turbine and of the filter, according to a third aspect of the invention.

A third aspect of the invention relates to the arrangement of the waste suction turbine and of the filter for the sucked air. FIG. 14 shows a right side view and a profile view of the arrangement according to this third aspect. This arrangement is installed inside the compartment 6 shown in FIG. 1. In the profile view, the front 100 and the rear 101 of the sweeper are indicated. It can be seen in the right side view that the arrangement comprises a waste suction turbine 102, a motor 103, for example electrical, which drives the turbine and which is mounted on the axis of the turbine, and a filter 104 mounted in direct contact with the turbine intake.

Preferably and as shown in FIG. 14, the filter is a cylindrical filter which is mounted coaxially with the motor and the turbine, the assembly being oriented transversely relative to the sweeper. The suction mouth 4 can also be seen, through which the waste is sucked to a tank 105 in which the waste is collected. The waste passes through a pipe 106 before arriving in the tank 105. The air that is sucked in passes from the tank 105 into the cylindrical filter 104 by a lateral inlet 107, then to the center of the filter 104 through a cylindrical layer 108 of filtration materials which retain the dust and other particles. The filtered air is then sucked by the turbine 102 which ejects it finally through an exhaust pipe 109. The arrangement of the motor 103, of the turbine 102 and of filter 104 which is in direct contact with the turbine is advantageous with respect to the existing sweepers. This arrangement is compact. Furthermore, this arrangement makes it possible to optimize the pressure losses and obtain a very good suction efficiency with a low energy consumption.

The invention relates to a sweeper according to each of the three aspects described above, independently of one another. The invention also covers each combination of these three aspects.

The invention claimed is:

1. A sweeper comprising a frame (10), at least three wheels (5), a propulsion motor, a cabin (1) for the driver, one or more brushes (2), each brush being able to perform a rotation relative to an armature (19) mounted at the end of a brush-holder arm (3) which extends (a) either in front of or in the periphery of the cabin, or (b) both in front of and in the periphery of the cabin, and waste suction and collection means, wherein each of the brush-holder arms (3) comprises:

two pairs of profile members, each pair comprising a top profile member (11) and a bottom profile member (12), the top and bottom profile members being:
respectively connected to the frame or to a structure connected to the frame, by a first pair of pivots (15, 16), allowing the pivoting of the profile members relative to the frame (10) about horizontal axes,
respectively connected to the armature (19) of the brush (2), by a second pair of pivots (17, 18), allowing the pivoting of the profile members relative to the armature (19) about horizontal axes,
such that the four pivots (15, 16, 17, 18) of each pair of profile members form a deformable parallelogram, the two parallelograms having essentially the same dimensions and being situated in parallel vertical planes,
an actuator (25) mounted between the pairs of profile members, the actuator being configured to actuate the deformation of said parallelograms so as to raise or lower the brush (2) in a vertical plane,
and wherein the actuator (25) is configured such that when the brush (2) is raised to the maximum, the actuator (25) is positioned below the top profile members (11) of said pairs of profile members,
characterized in that:
bottom pivots (16, 18) of each of the pairs of profile members are arranged backward in a horizontal direction relative to the top pivots (15 and 17),
each of the top (11) and bottom (12) profile members of each pair of profile members (11, 12) is formed by two straight parts (35, 36) secured to one another, a first part (35) present on the side of the armature of the brush (2) which is essentially oriented horizontally when the brush is raised to the maximum, and a second part (36) present on the side of the frame (10) which is inclined downward when the brush (2) is raised to the maximum.

2. The Sweeper according to claim 1, characterized in that:
each of the brush-holder arms (3) is provided with a mechanism configured to pivot the brush-holder arm about an essentially vertical axis, said mechanism comprising a linear actuator (54) and a first auxiliary arm (57, 75, 110), the actuator (54) being mounted between two pivots (55, 56), one of the two pivots (55) being connected to the frame (10) and the other pivot (56) being connected to the first auxiliary arm (57, 75, 110), the latter being able to pivot about the same essentially vertical axis as the brush-holder arm (3), but independently thereof,
the first auxiliary arm (57, 75, 110) and the brush-holder arm (3) are connected to one another at least by a first spring (59, 82, 115) and by an abutment (61, 77, 114), configured to maintain a constant position of the brush-holder arm (3) relative to the first auxiliary arm upon the actuation of the actuator (54) in either one of the two linear directions, said actuation generating a rotation of the assembly of the first auxiliary arm (57, 75, 110) and of the brush-holder arm (3) in one of the two rotational directions,
in case of the presence of an external lateral force acting on the brush (2) and pushing it towards the interior of the sweeper, the first spring (59, 82, 115) allows a pivoting of the brush-holder arm (3) towards the frame (10), without pivoting of the first auxiliary arm (57).

3. The sweeper according to claim 2, comprising a support (60) which is fixed to the brush-holder arm (3), and wherein a point of the first auxiliary arm (57), said point being located at the other side of said essentially vertical axis than the side at which the actuator (54) is located, is connected to one of the ends of the first spring (59), the other end of said first spring (59) being connected to the support (60) which is fixed to the brush-holder arm (3), and wherein the displacement of the first auxiliary arm (57) towards the support (60) is limited by the abutment (61) which is a push abutment, such that the actuation of the actuator (54) in either one of the two linear directions generates a rotation of the first auxiliary arm (57) in one of the two rotational directions, the first auxiliary arm (57) driving the brush-holder arm (3) by means of the abutment (61) or by means of the first spring (59).

4. The sweeper according to claim 2, further comprising a second spring (79), a support (81) which is fixed to the brush-holder arm (3), a second auxiliary arm (78), and wherein the abutment (77) is a spring abutment, the second auxiliary arm (78) being able to pivot about the same essentially vertical axis as the brush-holder arm (3) and the first auxiliary arm (75) but independently thereof, the first spring (82) being mounted between the first and the second auxiliary arms (75,78), the spring abutment (77) and the first spring (82) being configured to be able to keep the two auxiliary arms (75,78) fixed to one another as long as the spring abutment (77) is not broken, the second spring (79) being connected at one of its ends to a rod (85) which is connected to the second auxiliary arm (78) by a pivot (86), the second spring (79) abutting at its second end on the support (81), the second spring (79) surrounding said rod (85), said rod (85) passing through the support (81) and being provided with a retaining block (80) which prevents the separation of said rod (85) from the support (81),
such that:
the actuation of the actuator (54) in either one of the two linear directions generates a rotation of the first auxiliary arm (75) in one of the two rotational directions, the first auxiliary arm (75) driving the brush-holder arm (3) by means of the retaining block (80) or by means of the second spring (79), the spring abutment (77) and the first spring (82) are configured to maintain the connection between the auxiliary arms (75,78) upon the actuation of the brush-holder arm by the actuator (54), the spring abutment (77) is configured to be broken by lateral or frontal forces of a predefined level, exerted on the brush-holder arm (3), such that the brush-holder arm can temporarily pivot relative to the first auxiliary arm (75), without forcing the actuator (54).

5. The sweeper according to claim 4, wherein, in the case of the presence of a lateral force which tends to move the brush-holder arm (3) away from the frame (10), the second spring (79) is compressed allowing a rotation of the brush-holder arm relative to the first auxiliary arm (75), the latter remaining immobile, and wherein said compression of the second spring (79) is configured to continue until it breaks the spring abutment (77), thus allowing the first spring (82) to pull the brush-holder arm (3) backwards.

6. The sweeper according to claim 5, wherein the spring abutment is a spring plunger (77).

7. The sweeper according to claim 4, wherein the spring abutment is a spring plunger (77).

8. The sweeper according to claim 2, wherein the first auxiliary arm (110) comprises a first part (110a) on one side of the essentially vertical axis and a second part (110b) on the other side of said essentially vertical axis, the first part (110a) being connected to the second pivot (56), the sweeper further comprising a second auxiliary arm (112) which can be pivoted about the same essentially vertical axis as the brush-holder arm (3) and the first auxiliary arm (110) but independently thereof, the first spring (115) and the abutment (114), which is a push abutment, being mounted between the second auxiliary arm (112) and the brush-holder arm (3), a second spring (118) being mounted between the second part (110b) of the first auxiliary arm and the second auxiliary arm (112), the second spring (118) being connected at the first of its two ends to a rod (116) which extends inside the second spring (118), said rod (116) being connected to the second auxiliary arm (112) by a pivot (117), the second spring abutting at its second on the second part (110b) of the first auxiliary arm, the rod (116) being able to slide relative to the first auxiliary arm (110) and the rod (116) comprising a retaining block (119) which prevents the separation of the rod from the first auxiliary arm (110), such that:

the actuation of the actuator (54) in either one of the two linear directions generates a rotation of the first auxiliary arm (110) in one of the two rotational directions, the first auxiliary arm (110) driving the brush-holder arm (3) by means of the abutment (114) or by means of the first spring (115), in case of presence of a lateral force which tends to move the brush-holder arm (3) away from the frame (10):
first, the second spring (118) is compressed, allowing the second auxiliary arm (112) to pivot relative to the first arm (110), without forcing the actuator (54),
when the second spring (118) reaches a predefined level of compression, this spring extends itself, pulling the brush-holder arm (3) backwards.

9. The sweeper according to claim 2, further comprising an additional spring (65) mounted between the frame (10) and a structure (66) that can be displaced in the horizontal direction, said displaceable structure being connected to a support arm (67, 83', 120'), the brush-holder arm (3) and the first auxiliary arm (57, 75, 110) being connected to the support arm such that:

the brush-holder arm (3) and the first auxiliary arm (57, 75, 110) can be pivoted relative to the support arm (67, 83', 120'), about said essentially vertical axis, the additional spring (65) is configured to absorb the frontal shocks exerted on the brush-holder arm (3).

10. The Sweeper according to claim 1, characterized in that each of the brush-holder arms (3) is provided with a mechanism configured to pivot the brush-holder arm about an essentially vertical axis, said mechanism comprising a linear actuator (54) and a first auxiliary arm (57, 75, 110), the actuator (54) being mounted between two pivots (55, 56), one of the two pivots (55) being connected to the frame (10) and the other pivot (56) being connected to the first auxiliary arm (57, 75, 110), the latter being able to pivot about the same essentially vertical axis as the brush-holder arm (3) but independently thereof, the sweeper further comprising a spring (65) mounted between the frame (10) and a structure (66) that can be displaced in a horizontal direction, said displaceable structure being connected to a support arm (67, 83', 120'), the brush-holder arm (3) and the first auxiliary arm (57, 75, 110) being connected to the support arm such that:

the brush-holder arm (3) and the first auxiliary arm (57, 75, 110) can pivot relative to the support arm (67, 83', 120') about said essentially vertical axis, the spring (65) is configured to absorb the frontal shocks exerted on the brush-holder arm (3).

11. The sweeper according to claim 1, wherein the actuator (25) is a hydraulic actuator comprising a cylinder (40) pivotably connected to the frame (10) or to a structure connected to the frame (10) by a first pivot (27) and a piston (41) which is secured to a rod (42), said rod being pivotably connected to the armature (19) of the brush (2) by a second pivot (28), the piston dividing the cylinder into two compartments, a first compartment present on the side of the frame (10) and a second compartment present on the side of the brush (2), and wherein:

the first pivot (27) of the actuator is situated above said first pairs of pivots (15,16) of the profile members, the second pivot (28) of the actuator is situated between said second pairs of pivots (17,18) of the profile members.

12. The sweeper according to claim 11, wherein the actuator is a hydraulic actuator (25) comprising a cylinder (40) pivotably connected to the frame (10) or to a structure connected to the frame (10) by a first pivot (27) and a piston (41) which is secured to a rod (42), said rod being pivotably connected to the armature (19) of the brush (2) by a second pivot (28), the piston dividing the cylinder into two compartments, one compartment present on the side of the frame (10) and one compartment present on the side of the brush (2), wherein the actuator is connected to a hydraulic fluid tank and to (a) either a hydraulic pump or an accumulator battery or to (b) both a hydraulic pump and an accumulator battery, and wherein the actuator is configured such that:

to raise the brush (2), the compartment on the side of the armature (19) is placed under hydraulic pressure, such that the brush is raised by the rod (42) which pulls on the brush-holder arm (3), to lower the brush (2), the pressure in the compartment on the side of the armature is reduced, such that the weight of the brush-holder arm, of the armature and of the brush make the brush descend.

13. The sweeper according to claim 12, wherein only the compartment on the side of the brush is connected to said pump.

14. The sweeper according to claim 12, wherein the two compartments form part of a hydraulic circuit comprising the pump and the tank.

15. The sweeper of claim 14, wherein the hydraulic circuit further comprises one or more accumulators.

16. The sweeper according to claim 1, wherein the actuator is a hydraulic actuator (25) comprising a cylinder (40) pivotably connected to the frame (10) or to a structure connected to the frame (10) by a first pivot (27) and a piston (41) which is secured to a rod (42), said rod being pivotably connected to the armature (19) of the brush (2) by a second pivot (28), the piston dividing the cylinder into two compartments, one compartment present on the side of the frame (10) and one compartment present on the side of the brush (2), wherein the actuator is connected to a hydraulic fluid tank and to (a) either a hydraulic pump or an accumulator battery or to (b) both a hydraulic pump and an accumulator battery, and wherein the actuator is configured such that:
   to raise the brush (2), the compartment on the side of the armature (19) is placed under hydraulic pressure, such that the brush is raised by the rod (42) which pulls on the brush-holder arm (3),
   to lower the brush (2), the pressure in the compartment on the side of the armature is reduced, such that the weight of the brush-holder arm, of the armature and of the brush make the brush descend.

17. The sweeper according to claim 16, wherein only the compartment on the side of the brush is connected to said pump.

18. The sweeper according to claim 16, wherein the two compartments form part of a hydraulic circuit comprising the pump and the tank.

19. The sweeper of claim 18, wherein the hydraulic circuit further comprises one or more accumulators.

20. The Sweeper according to claim 1, wherein said waste and collection means comprising a suction turbine (102), a motor (103) configured to drive the turbine, and a filter (104) for filtering the sucked air, characterized in that the filter is mounted in direct contact with the inlet of the turbine.

21. The sweeper according to claim 20, wherein the filter is a cylindrical filter (104) and wherein the motor, the turbine and the filter are mounted coaxially.

22. The sweeper according to claim 21, wherein the common axis of the motor, of the turbine and of the filter is oriented transversely relative to the sweeper.

\* \* \* \* \*